United States Patent [19]

Shinozaki et al.

[11] 4,437,061

[45] Mar. 13, 1984

[54] SPEED DETECTOR FOR SEWING MACHINES

[75] Inventors: Nozomu Shinozaki, Hirakata; Shigeo Neki, Osaka; Takashi Dohi, Hirakata, all of Japan

[73] Assignee: Matsushita Electric Industrial Co., Ltd., Osaka, Japan

[21] Appl. No.: 288,514

[22] Filed: Jul. 30, 1981

[30] Foreign Application Priority Data

Jul. 31, 1980 [JP] Japan .............................. 55-106126

[51] Int. Cl.$^3$ .............................................. G01R 1/04
[52] U.S. Cl. ....................................... 324/166; 310/156
[58] Field of Search ....................... 310/111, 156, 168; 324/166, 173, 174

[56] References Cited

U.S. PATENT DOCUMENTS 3,970,935  7/1976  Beery .................................. 324/166

FOREIGN PATENT DOCUMENTS 2161014  6/1973  Fed. Rep. of Germany ...... 324/166
2263783  7/1973  Fed. Rep. of Germany ...... 324/166
2823313  12/1979  Fed. Rep. of Germany ...... 310/168

OTHER PUBLICATIONS

Darling; "Magnetic Pulse Emitter"–IBM Tech. Disclosure Bulletin–Mar. 1969–p. 1362.

*Primary Examiner*—Stanley T. Krawczewicz
*Assistant Examiner*—Jose M. Solis
*Attorney, Agent, or Firm*—Lowe, King, Price & Becker

[57] ABSTRACT

A speed detector comprises a rotary shaft for rotation with a sewing machine, a ring-shaped permanent magnet uniformly magnetized in a direction parallel to the axis of the rotary shaft, at least one ring-shaped, internally toothed ferromagnetic member or stator and an externally toothed ferromagnetic circular member or rotor which is secured to the rotary shaft inside the stator to form a varying air gap between the opposing teeth. The permanent magnet and the two ferromagnetic members are disposed to form a closed loop magnetic circuit in which a ring-shaped coil is disposed. The air gap and hence the reluctance of the magnetic circuit changes periodically with the revolution of the rotary shaft so that a voltage is generated in the coil which varies at a frequency proportional to the operational speed of the sewing machine.

12 Claims, 5 Drawing Figures

FIG. 3
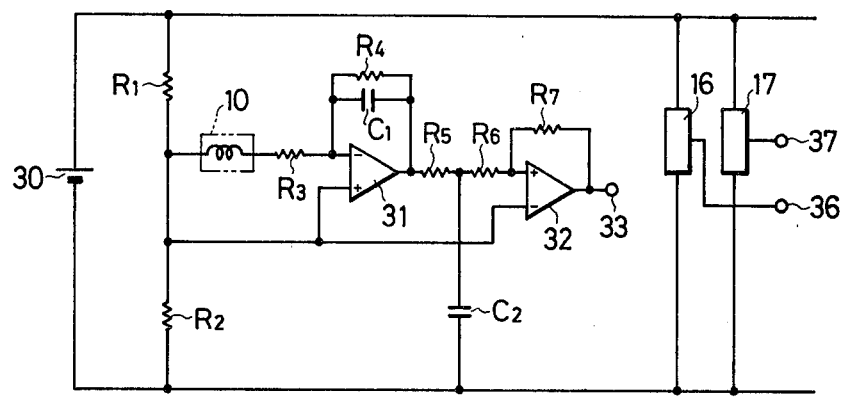
FIG. 4A
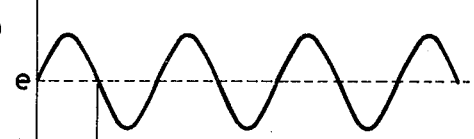
FIG. 4B
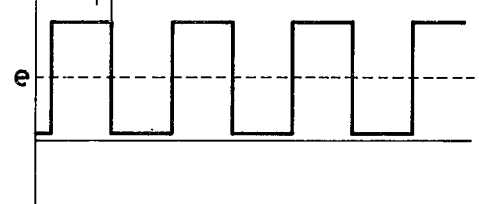
FIG. 4C

SPEED DETECTOR FOR SEWING MACHINES

BACKGROUND OF THE INVENTION

The present invention relates to a speed detector which is particularly suitable for digital processing purposes. The invention is particularly suitable for industrial sewing machines.

The industrial sewing machine is usually driven by a motor having an electromagnetically operated clutch and brake mechanism. Namely, the continuously rotating torque of the motor is coupled to the sewing machine shaft by friction when the clutch mechanism is operated for acceleration and decoupled to allow deceleration by the brake mechanism in order for the sewing speed to vary in a range from 200 rpm to 6000 rpm. To achieve this range of speed control it is necessary that the sewing machine speed be accurately detected.

The sewing speed can either be detected by generating a speed related voltage signal of which the amplitude represents the speed, a method known as amplitude modulation (AM) technique, or generating a speed related pulse signal of which the frequency represents the speed, known as frequency modulation (FM) technique. The present invention is based on the frequency modulation technique using a magnetic sensing coil.

Conventional sewing machine speed detectors, which have been most extensively used, comprise a ring-shaped, circumferentially magnetized permanent magnet which is driven synchronously with the sewing machine and a sensing coil for developing an AC voltage proportional to the speed of the sewing machine. However, this type of speed detector has a number of drawbacks in that it is difficult to manufacture permanent magnets with a high degree of accuracy sufficient to assure consistency in the magnitude of magnetization and in the degree of concentricity among the produced magnets. The desired consistency is necessary since such variations would result in errors in the speed signal. Further manufacturing difficult is the need to provide as many pole pieces as possible for high precision speed control purposes. The recent development of digital technology has made this technology economically applicable to many uses so that digital systems can be implemented at a lower cost than analog systems are. The digital implementation of sewing machine speed control requires that the speed pulse be exactly proportional in repetition frequency to the sewing machine speed. Moreover, the number of such pulses generated per revolution should be higher than 100, a value not attainable with conventional speed detectors.

SUMMARY OF THE INVENTION

The present invention obviates these problems and has for its object the provision of a speed detector for digital processing applications, particularly for industrial sewing machines, which allows detection of the speed with a high degree of accuracy.

According to the invention, the speed detector for a sewing machine comprises a rotor rotatable with a driven shaft of the sewing machine, a stator fixed to a housing of the sewing machine, the rotor and stator being formed of a ferromagnetic material and each having a multitude of teeth which face in opposition to the teeth of the other forming a gap therebetween, a permanent magnet forming a closed loop magnetic circuit with the rotor and stator, and a coil which intersects the magnetic flux of the closed loop magnetic circuit to generate a voltage which is used to generate a train of pulses at a frequency proportional to the rotational speed of the sewing machine through an amplifier and a waveshaping circuit.

Preferably the speed detector comprises a ring-shaped permanent magnet which is uniformly magnetized in a direction parallel to the axis of the rotary shaft, a ring-shaped, internally toothed ferromagnetic member, an externally toothed ferromagnetic circular member disposed inside of the ring-shaped ferromagnetic member with a spacing therefrom to form an air gap between the teeth of each the ferromagnetic member and the teeth of the other ferromagnetic member, the ferromagnetic members forming a closed loop magnetic circuit with the permanent magnet and disposed rotatably with respect to each other by revolution of the rotary shaft so that the air gap varies periodically at a rate proportional to the speed of revolution of the rotary shaft; and a ring-shaped coil disposed in the closed loop magnetic circuit to develop a voltage at a frequency proportional to the rate of variation of the air gap.

Since the permanent magnet is magnetized uniformly in the axial direction, the two ferromagnetic members which act as the stator and rotor can be provided with a greater number of teeth than is provided with prior art techniques so that high frequency speed signals can be obtained advantageously for high precision speed control purposes, eliminating costly high precision machining and magnetization processes.

BRIEF DESCRIPTION OF THE DRAWINGS

Other features and advantages of the invention will become apparent from the following description read in conjunction with the accompanying drawings, in which:

FIG. 3 is an illustration of the circuit diagram of the printed-circuit board of FIG. 1;

FIGS. 4A to 4C are illustrations of waveforms appearing in the circuit diagram of FIG. 3.

DETAILED DESCRIPTION

Figure 1:
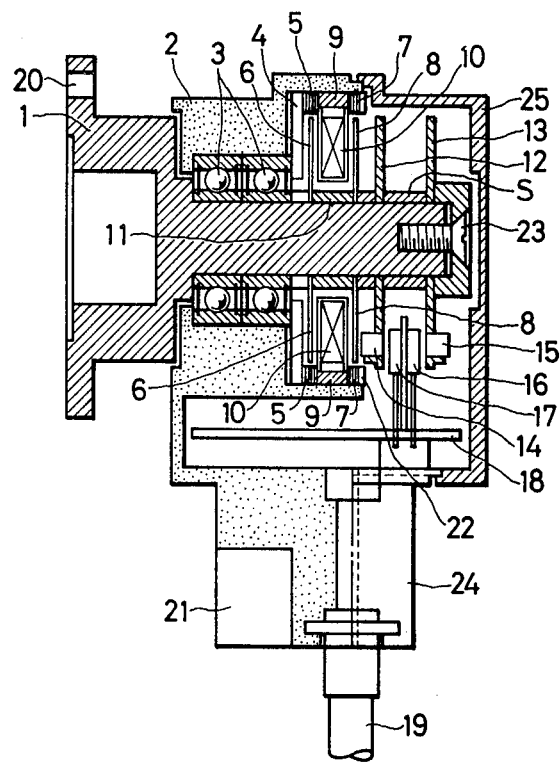
FIG. 1 is an illustration of an axial cross-section of a first embodiment of the invention.
Figure 2:
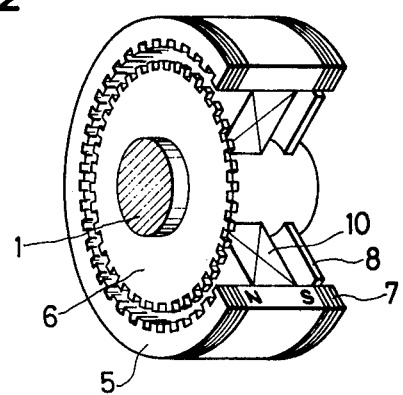
FIG. 2 is an illustration of a partially cutaway, perspective view of a portion of the embodiment of FIG. 1.

In a first embodiment of the present invention shown in FIG. 1 a rotary shaft 1 of aluminum or light metal is fastened by screws through holes 20 to a sewing machine pulley to reciprocate the needle between upper and lower positions. A moulded plastic housing is secured stationarily in position as at 2. A pair of ball bearings 3 is secured by a fixing ring 4 between the inner wall of the housing 21 and the rotary shaft 1. A first ring-shaped ferromagnetic member or stator 5 is positioned in a side-by-side relationship with a ring-shaped permanent magnet 9. According to a feature of the invention the magnet 9 is magnetized uniformly in a direction parallel to the axis of the rotary shaft 1. A first rotor 6, which comprises a ferromagnetic wheel, is secured to the rotary shaft 1 and disposed inside of the first stator 5. The stator 5 is internally toothed and the rotor 6 is externally toothed and they form a varying air gap between the opposed teeth, as shown in FIG. 2. This air gap varies periodically as the rotor 6 turns with respect to the stator 5 at a rate proportional to the rotational speed of the sewing machine.

A second stator 7, identical to the first stator 5 but having no toothed portion, is located on the opposite side of the permanent magnet 9 so that the latter is sandwiched between the two ring-shaped stators. A second rotor 8, identical to the first rotor 6 but having no toothed portion, is secured to the shaft 1 and disposed inside of the second stator 7 forming an air gap between them. A ring-shaped coil 10 is fixed to the inner wall of the permanent magnet 9 with a spacing from the rotors 6 and 8 and a ring-shaped yoke 11 fitted to the rotary shaft 1. A closed loop magnetic circuit is thus formed by the stator 5, rotor 6, yoke 11, rotor 8 and stator 7, and in this magnetic circuit the coil 10 is disposed.

The stators 5, 7, permanent magnet 9 and coil 10 are all rigidly fixed to the housing by screws 22 and the rotors 6, 8 and rotary disks 12, 13 are all fixed to the rotary shaft 1 with a spacer S between the disks. The right side of the speed detector is covered by a moulded resin cap 25. Both stator 5 and rotor 6 may have an equal number of teeth, typically from 100 to 200, or different numbers so that one of them has an integral multiple of the 100 to 200 teeth of the other.

The operation of the speed detector of the invention is as follows. With the revolution of the rotor wheel 6, the reluctance of the closed loop magnetic circuit varies so that it is at a minimum when the teeth of each ferromagnetic member correspond to those of the other and at a maximum when the teeth of each corresponds to the grooves of the other. The magnetic flux that intersects the coil 10 has therefore a maximum density in response to the occurrence of a teeth-to-teeth correspondence between the stator 5 and rotor 6 and has a minimum density in response to the occurrence of a teeth-to-groove correspondence between them. Since the voltage developed in the coil 10 is proportional to the rate of change in flux density, the rotation of rotor 6 results in changes in flux density, thereby generating in said coil an AC voltage at a frequency "f" proportional to the operating speed of the sewing machine. The frequency "f" of the generated AC voltage is given by f=A.N/60 Herz (where A represents the number of teeth and N represens the rotational speed per minute), so that the period "t" is given by t=60/A.N seconds.

The period "t" needs to be exactly inversely proportional to the sewing machine speed for precision speed control purposes. According to a feature of the invention, an averaging effect is produced in the reluctance variations as the rotor wheel 6 revolves and this averaging effect minimizes errors in period "t" which would otherwise occur due to errors in tooth pitch.

Since the permanent magnet 9 is uniformly magnetized in the than axial direction rather than circumferential direction, a greater number of teeth could be provided for stator 5 and rotor 6 and therefore a higher frequency speed signal could be obtained than is possible with conventional speed detectors. This is advantageous for digitally controlling speed with a high degree of precision.

In FIG. 3, the electronic circuit of the invention is shown as comprising operational amplifiers 31, 32 which are powered by a DC voltage source 30 and cascaded to provide a speed signal to an output terminal 33. The Hall generators 16 and 17 are also powered by the DC source to deliver needle position signals to terminals 36 and 37. The coil 10 has its one end connected to a junction between resistors R1 and R2, which are connected in series across the DC source, and has its other end connected by a resistor R3 to the inverting input of the operational amplifier 31. The inverting input of the amplifier 31 is also coupled through a resistor R4 shunted by a capacitor C1 to the output of the amplifier 31 which in turn is connected by series-connected resistors R5 and R6 to the noninverting input of the operational amplifier 32, with a junction between R5 and R6 being coupled to the negative polarity line by a capacitor C2 to form an integrator therewith.

The voltage developed in the coil 10, which ranges from several tens to several hundreds of millivolts as shown in FIG. 4A, is amplified by amplifier 31 with a gain determined by the ratio of R3 to R4. The resistor R3 forms a low-pass filter with the capacitor C1 to cutoff the high frequency components of the voltage signal to eliminate their disturbing radio interference. The output voltage of the amplifier 31 varies above and below a voltage level "e" that occurs at the junction between resistors R1 and R2. Noise still contained in the output of amplifier 31 is eliminated by the integrator formed by the resistor R5 and capacitor C2. The amplifier 32 has its output coupled to its noninverting input by a feedback resistor R7 which together with the input resistor R6 causes the amplifier 32 to have a hysteresis so that the input AC voltage is converted into rectangular pulses as shown in FIG. 4C. Although the integrator introduces a delay interval "d" as shown in FIG. 4B, the amount of such delay is negligible even if it has a maximum at the highest speed of the sewing machine.

The stators 5 and 7 each preferably have at least three times the thickness of the rotors 6 and 8 for the purposes of minimizing undesirable voltage fluctuations due to manufacturing errors which might exist if the rotors 6 and 8 are somewhat tilted to the vertical. For this purpose the stators are preferably constructed of a sintered alloy, or more preferably a lamination of die-passed sheet iron.

It is preferred that the stator 7 and rotor 8 be provided with teeth which are axially aligned with the teeth of stator 5 and rotor 6, respectively. This serves to increase the voltage developed in the coil 10. It is to be noted that the permanent magnet 9 may alternatively be constructed so that it can be fitted to the rotary shaft 1 between the rotary members 6 and 8 and the yoke 11 may be secured to the housing between the stators 5 and 7 so long as they form a closed loop magnetic circuit.

The speed detector of the invention may also include permanent magnets 14 and 15 mounted on rotary wheels 12 and 13 respectively and Hall generators 16 and 17 stationarily mounted with respect to the permanent magnets 14 and 15 to detect the proximity thereto of the permanent magnets 14 and 15. This arrangement is provided for the purpose of detecting the needle upper and lower positions to facilitate sewing operations. A printed-circuit board 18, which carries thereon the electronic circuitry of FIG. 3, is connected to the Hall generators 16 and 17. Numeral 19 is a cable fixed in position by a resin plate 24 for power supply and delivery of a speed signal derived from the printed-circuit board 18.

Figure 5:
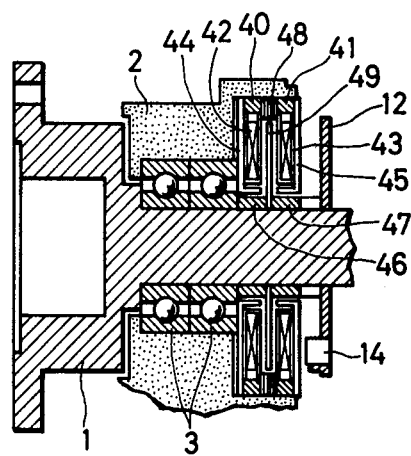
FIG. 5 is an illustration of another embodiment of the invention.

Another embodiment of the invention is illustrated in FIG. 5 in which the corresponding parts are identified by the same numbers as those used to indicate the corresponding parts in FIG. 1. Numerals 40 and 41 indicate ring-shaped permanent magnets each of which is magnetized in a direction parallel to the axis of the rotary shaft 1, but opposite to the direction of magnetization of the other so that the N poles of both magnets are positioned close to each other. Coils 42 and 43 are provided inside the ring-shaped magnets 40 and 41 respectively. To the rotor shaft 1 are secured ferromagnetic spacers 46 and 47 between which is provided an externally toothed rotor 49. Around the circumference of the rotor 49 is disposed an internally toothed stator 48.

Magnetic flux from the permanent magnet 40 passes through a closed loop magnetic circuit formed by the stator 48, rotor 49, spacer 46 and a yoke 44. Likewise, the closed loop magnetic circuit for the flux from the magnet 41 is formed by the stator 48, rotor 49, spacer 47 and a yoke 45. Since the stator 48 and rotor 49 are commonly shared by both magnetic circuits, the reluctances of both circuits and hence their magnetic flux changes occur in exact phase with each other and the voltage developed in the coil 42 is opposite in phase to the voltage developed in the other coil 43. Therefore, by connecting the coils 42 and 43 in a series circuit in an opposing sense a summation of the respective voltages can result.

With the coils being connected in such a manner, voltages which might be respectively developed in these coils by induction from an external source or sources are cancelled out, so that the output signal is free from noise. When the combined output signal from the coils 42 and 43 is applied as an input to the circuit of FIG. 3 instead of the output of coil 10, a highly noise immune speed detector can be implemented.

What is claimed is:

1. A speed detector for a sewing machine comprising a rotor rotatable with a drive shaft of the sewing machine, a stator fixed to a housing of the sewing machine, said rotor and stator being formed of a ferromagnetic material and each having a multitude of teeth which face in opposition to the teeth of the other forming a gap therebetween, a permanent magnet forming a closed loop magnetic circuit with said rotor and stator, a coil which intersects the magnetic flux of said closed loop magnetic circuit to generate a voltage which is used to generate a train of pulses at a frequency proportional to the rotational speed of said sewing machine through an amplifier and a waveshaping circuit, further comprising an integrating circuit connected to one of said amplifier and waveshaping circuit.

2. A speed detector for a sewing machine comprising a rotor rotatable with a drive shaft of the sewing machine, a stator fixed to a housing of the sewing machine, said rotor and stator being formed of a ferromagnetic material and each having a multitude of teeth which face in opposition to the teeth of the other forming a gap therebetween, a permanent magnet forming a closed loop magnetic circuit with said rotor and stator, a coil which intersects the magnetic flux of said closed loop magnetic circuit to generate a voltage which is used to generate a train of pulses at a frequency proportional to the rotational speed of said sewing machine through an amplifier and a waveshaping circuit, further comprising a second permanent magnet to form a second closed loop magnetic circuit having a common magnetic path with the first-mentioned magnetic circuit, and a second coil disposed in said second magnetic circuit, the first-mentioned coil and said second coils connected in a series circuit so that the voltages developed respectively in said coils are constructively added.

3. A speed detector having a rotary shaft adapted for connection to a rotating body, comprising:

a ring-shaped permanent magnet uniformly magnetized in a direction parallel to the axis of said rotary shaft;

a ring-shaped, internally toothed ferromagnetic member;

an externally toothed ferromagnetic circular member disposed inside of said ring-shaped ferromagnetic member with a spacing therefrom to form an air gap between the teeth of each said ferromagnetic member and the teeth of the other ferromagnetic member, said ferromagnetic members forming a closed loop magnetic circuit with said permanent magnet and disposed rotatably with respect to each other by revolution of said rotary shaft so that said air gap varies periodically at a rate proportional to the speed of revolution of said rotary shaft;

a ring-shaped coil disposed in said closed loop magnetic circuit to develop a voltage at a frequency proportional to the rate of variation of said air gap;

a second ring-shaped ferromagnetic member disposed in a side-by-side relationship with said ring-shaped permanent magnet opposite to the first-mentioned ring-shaped ferromagnetic member, and a second ferromagnetic circular member rotatable with and axially spaced from the first-mentioned ferromagnetic circular member and disposed inside said second ring-shaped ferromagnetic member to form a second air gap therebetween, wherein said coil is located between said first and second ferromagnetic circular members.

4. A speed detector as claimed in claim 3, wherein said ferromagnetic circular member is connected to said rotary shaft.

5. A speed detector as claimed in claim 4 or 3, wherein said second ring-shaped ferromagnetic member is internally formed with a plurality of teeth axially aligned with the teeth of said first ring-shaped ferromagnetic member, and wherein said second ferromagnetic circular member is externally formed with a plurality of teeth axially aligned with the teeth of said first ferromagnetic circular member.

6. A speed detector as claimed in claim 4 or 5, further comprising a second ring-shaped permanent magnet magnetized in the axial direction of said rotary shaft but opposite to the direction of magnetization of the first-mentioned permanent magnet and disposed so that said ring-shaped ferromagnetic member is sandwiched between said first and second ring-shaped permanent magnets to form a second closed loop magnetic circuit which said ferromagnetic members, and a second coil disposed in said second magnetic circuit to develop a voltage at a frequency proportional to the rate of variation of said air gap, the first and second coils being connected in a series circuit so that the voltages respectively developed in said coils are constructively added.

7. A speed detector as claimed in claim 4 or 3, further comprising means for eliminating a higher frequency component of said voltage and means for shaping the waveform of the output of said eliminating means into a rectangular pulse.

8. A sewing machine having a rotary shaft for reciprocating a needle, comprising:

a ring-shaped permanent magnet uniformly magnetized in a direction parallel to the axis of said rotary shaft;

a ring-shaped, internally toothed ferromagnetic member;

an externally toothed ferromagnetic circular member disposed inside of said ring-shaped ferromagnetic member with a spacing therefrom to form an air gap between the teeth of each said ferromagnetic member and the teeth of the other ferromagnetic member, said ferromagnetic members forming a closed loop magnetic circuit with said permanent magnet and disposed rotatably with respect to each other by revolution of said rotary shaft so that said air gap varies periodically at a rate proportional to the speed of revolution of said rotary shaft;

a ring-shaped coil disposed in said closed loop magnetic circuit to develop a voltage at a frequency proportional to the rate of variation of said air gap;

a second ring-shaped ferromagnetic member disposed in a side-by-side relationship with said ring-shaped permanent magnet opposite to the first-mentioned ring-shaped ferromagnetic member, and a second ferromagnetic circular member rotatable with and spaced from the first-mentioned ferromagnetic circular member and disposed inside said second ring-shaped ferromagnetic member to form a second air gap therebetween, wherein said coil is located between said first and second ferromagnetic circular members.

9. A sewing machine as claimed in claim 8, wherein said ferromagnetic circular member is connected to said rotary shaft.

10. A sewing machine as claimed in claim 8, wherein said second ring-shaped ferromagnetic member is internally formed with a plurality of teeth axially aligned with the teeth of said first ring-shaped ferromagnetic member, and wherein said second ferromagnetic circular member is externally formed with a plurality of teeth axially aligned with the teeth of said first ferromagnetic circular member.

11. A sewing machine as claimed in claim 9 or 8, further comprising a second ring-shaped permanent magnet magnetized in the axial direction of said rotary shaft but opposite to the direction of magnetization of the first-mentioned permanent magnet and disposed so that said ring-shaped ferromagnetic member is sandwiched between said first and second ring-shaped permanent magnets to form a second closed loop magnetic circuit with said ferromagnetic members, and a second coil disposed in said second magnetic circuit to develop a voltage at a frequency proportional to the rate of variation of said air gap, the first and second coils being connected in a series circuit so that the voltages respectively developed in said coils are constructively added.

12. A sewing machine as claimed in claim 9 or 8, further comprising means for eliminating a higher frequency component of said voltage and means for shaping the waveform of the output of said eliminating means into a rectangular pulse.

* * * * *